United States Patent Office 2,844,313
Patented July 22, 1958

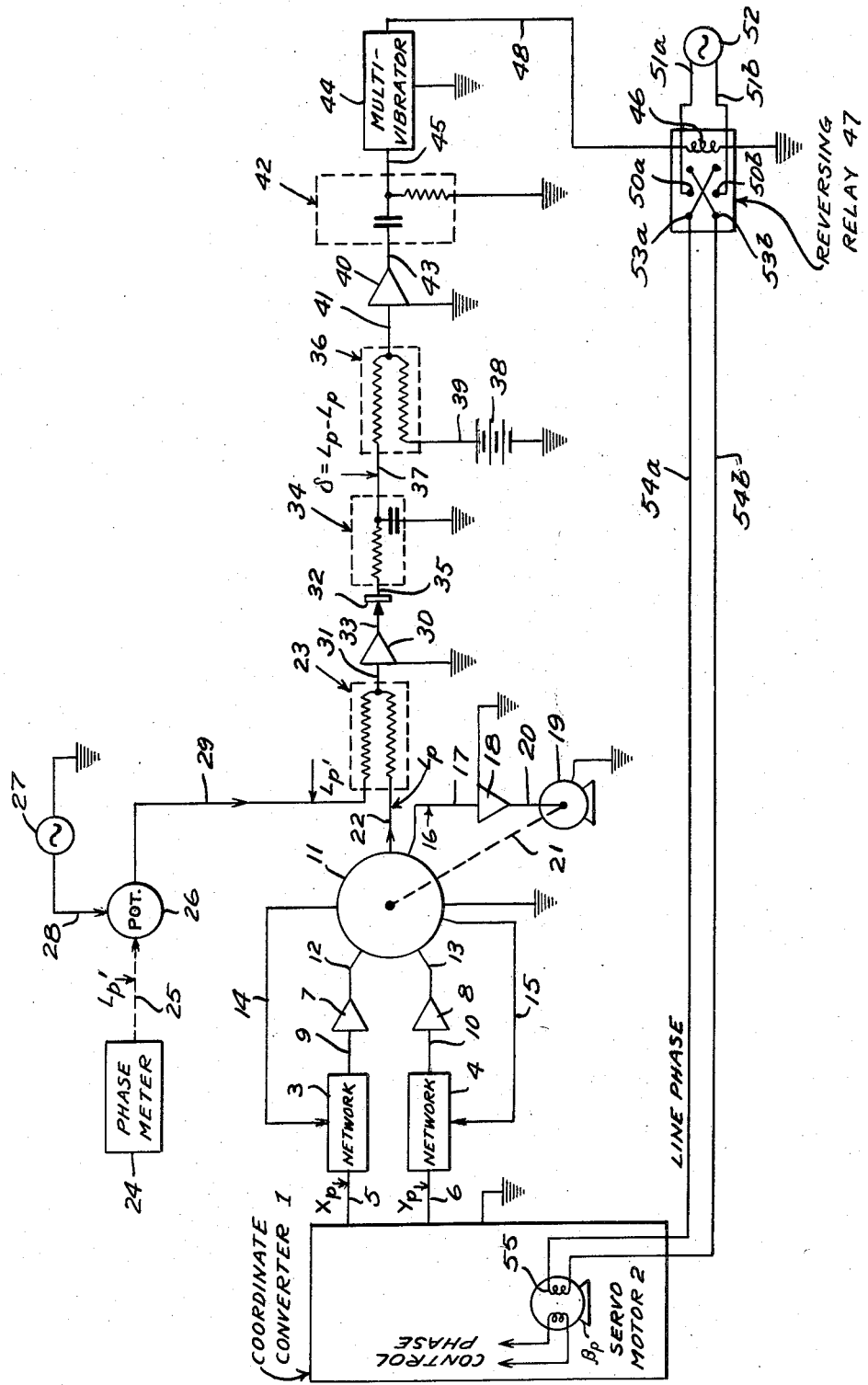

2,844,313

AMBIGUITY RESOLVER FOR A NAVIGATION POSITION INDICATOR

Victor H. Seliger, Kew Gardens, N. Y., assignor to Sperry Rand Corporation, Ford Instrument Company Division, Long Island City, N. Y., a corporation of Delaware Application January 24, 1957, Serial No. 636,059

5 Claims. (Cl. 235—61)

This invention relates to automatic three-station navigational systems and particularly to an ambiguity resolver for automatically eliminating any false position solution.

The ambiguity resolver contemplated by this invention may be employed in conjunction with a three-station-analog coordinate converter such as disclosed in copending application Serial No. 678,264, filed August 12, 1957.

In a three-station-radio-phase-comparison navigational system employing three ground station transmitters to provide hyperbolic coordinates of the relative aircraft position from airborne receivers and phase comparators, the aircraft position is represented by the intersection of two hyperbolic curves. Because branches of coplanar hyperbolas frequently intersect in two points rather than one point, the plane hyperbolic coordinates of a point are frequently insufficient to provide a unique determination of its position. For this reason a three-station-phase-comparison system requires circuit means to cope with two possible computed positions of an aircraft.

In general, this invention contemplates an ambiguity resolver to eliminate any false position indication of a precision converter by comparing the indicated polar distance $L_p$ of the aircraft from the central ground station, which may be a true or an ambiguous position, with the approximate time polar distance $L_p'$ of the aircraft as determined by an auxiliary system having poor accuracy but no ambiguity. When the comparison shows a small difference, the indicated result $L_p$ can be assumed to be a true aircraft position. Any comparison difference in excess of a preselected magnitude will signal an ambiguous aircraft position. In the proposed circuitry, this signal will automatically start the coordinate converter to search for and provide the true aircraft position.

As contemplated, there is provided a vector solver having a nulling loop, an airborne phase meter and a differential network. The vector solver is connected to receive the aircraft coordinate analog output from an automatic rectangular coordinate converter in a three-station navigational system. The vector solver yields a solution in accordance with the equation $L_p = \sqrt{X_p^2 + Y_p^2}$, where $X_p$ and $Y_p$ are either the true or the ambiguous rectangular coordinates of the aircraft. The differential network is connected between the vector solver and the airborne phase meter, the latter device providing a reliable but not highly accurate measure of the polar distance $L_p'$ of the aircraft from the central ground station to which the phase meter is referenced and synchronized. While the drift characteristic in conventional phase meters makes them unsuitable for long time accurate distance determinations, their approximate accuracy is suitable for a "yes-no" ambiguity resolution. The differences between the computed indication $L_p$ and the approximate but non-ambiguous polar distance $L_p'$ controls a bi-stable multivibrator which energizes a reversing relay, the multivibrator changing its output voltage levels when the quantity S exceeds a predetermined acceptable tolerance. The reversing relay renders the true solution stable and the ambiguous solution unstable by reversing the line-phase leads to the two-phase polar bearing $B_p$ servomotor in the coordinate converter. Such reversal will oblige the converter to seek the correct intersection of the two plane hyperbolic curves and thus yield the true aircraft position.

The features of the invention will be understood more clearly from the following detailed description taken in conjunction with the accompanying drawing in which:

The drawing is a schematic diagram of an ambiguity resolver connected to a three-station-navigational system coordinate converter, the converter providing rectangular coordinates from input hyperbolic coordinates.

Referring to the ambiguity resolver schematically disclosed in the drawing, a three-station-navigational system includes a hyperbolic-to-rectangular coordinate-converter 1 having a two phase polar bearing $B_p$ servomotor 2, the converter yielding the aircraft rectangular coordinate outputs $X_p$ and $Y_p$ in electrical analog form. The output terminals of the converter 1 are connected to the input terminals of networks 3 and 4 by conductors 5 and 6, respectively, the common output terminal of the converter 1 being connected to ground. The output of networks 3 and 4 are connected to the inputs of amplifiers 7 and 8 by conductors 9 and 10, respectively, the outputs of amplifiers 7 and 8 being connected to a vector solver 11 by conductors 12 and 13, respectively. A stabilizing voltage proportional to the rate of change of magnetic flux in the vector solver 11 is fed back to each of the networks 3 and 4 in a conventional manner for system stability by conductors 14 and 15 and the common input and output terminals of the vector solver 11 are connected to ground. The vector solver 11 has a nulling loop 16 connected to its nulling output terminal comprising a conductor 17 connected to the input of an amplifier 18 and a servomotor 19 connected to the amplifier output by a conductor 20, the shaft 21 of the servomotor 19 being connected to the shaft of the vector solver 11 so as to close the nulling loop. When the servomotor 19 is at equilibrium, voltage appearing from vector solver output conductor 22 to ground is determined by the formula $L_p = \sqrt{X_p^2 + Y_p^2}$, where $L_p$ is the computed polar distance of the aircraft at point P. The conductor 22 is connected to one input terminal of a differential network 23.

An approximate but non-ambiguous determination $L_p'$ of the polar distance of the aircraft at point P is provided by the phase meter 24 which is referenced to and synchronized with the central ground station. The phase meter operates on the principle that the phase displacement between the received signal and the airborne frequency standard is directly proportional to the polar distance from the ground station. The output shaft 25 of the phase meter 24 is operatively connected to displace the potentiometer 26 in direct proportion to the quantity $L_p'$. The electrical input side of the potentiometer 26 is connected to an A. C. reference voltage source 27 by a conductor 28, the other terminal of the A. C. voltage source 27 being connected to ground. The A. C. output side of the potentiometer 26 containing the information $L_p'$ is connected to the other input terminal of differential network 23 by a conductor 29.

The A. C. output side of differential network 23 is connected to an amplifier 30 by a conductor 31, the common input and output terminal of the amplifier 30 being connected to ground. The A. C. output side of amplifier 30 is connected to one side of a half wave rectifier 32 by a conductor 33, the other side of the rectifier being connected to a filter section 34 by a conductor 35. The D. C. output side of the filter section 34 is connected to one input terminal of a differential network 36 by a conductor 37. The other input terminal of differential network 36 is connected to the positive terminal of a D. C. reference voltage source 38 by a conductor 39 and the negative terminal of voltage source 38 is connected to ground. The D. C. output side of the differential network 36 is connected to an amplifier 40 by a conductor 41, one common input and output terminal of the amplifier 40 being connected to ground. The output side of amplifier 40 is connected to a differentialing network 42 by a conductor 43 and the output side of the network 42 is connected to the input terminal of a bistable multivibrator 44 by a conductor 45, one common input and output terminal of the multivibrator 44 being connected to ground. The output side of the multivibrator 44 is connected to a solenoid coil 46 of a reversing relay 47 by a conductor 48, the other side of solenoid coil 46 being connected to ground. The input pair of power terminals 50a and 50b of the reversing relay 47 are connected to an A. C. line 51a and 51b, the A. C. line being energized by an A. C. source 52. The output pair of power terminals 53a and 53b are connected by conductors 54a and 54b to the line phase winding 55 of the two phase $B_p$ servomotor 2, the latter device being a component of the coordinate converter 1.

Circuit elements of the ambiguity resolver have selected values so that a predetermined leval of voltage input to the amplifier 30 will trigger the bi-stable multivibrator 44 and thereby reverse the polarity of its output. The resulting reversal of relay 47 will interchange the A. C. leads 54a and 54b to the $B_p$ servomotor 2. The impressed voltage upon the amplifier 30 will be governed by the difference between the approximate polar distance $L_p'$ as yield by the phase meter 24 and the polar distance $L_p$ as yielded by the coordinates $X_p$ and $Y_p$ of the accurate coverter 1. Minor differences between $L_p$ and $L_p'$ will not trigger the bi-stable multivibrator. However, any false and ambiguous output of the converter 1 will cause the $(L_p - L_p')$ quantity to exceed the predetermined voltage level and the resulting reversal of line phase leads to the $B_p$ servomotor 2 will actuate the computer 1 to seek the correct aircraft position.

It is to be understood that various modifications of the invention other than those above described may be effected by persons skilled in the art without departing from the principle and scope of the invention as defined in the appended claims.

What is claimed is:

1. An ambiguity resolver comprising a non-ambiguous means for generating in flight the approximate distance from one of three ground stations, an ambiguous means for convertably generating in flight a true distance or an erroneous distance from said one of the three ground stations; said ambiguous means including a two phase polar bearing motor, an A. C. voltage source and a reversing relay connected between said A. C. voltage source and the said two phase polar bearing motor; a differential network connected between said ambiguous means and said non-ambiguous means and detection means connected to the said differential network and to the said ambiguous means for converting the output of the said ambiguous means in accordance with the output of said differential network, said reversing relay being controlled by said detection means.

2. An ambiguity resolver as claimed in claim 1 wherein said non-ambiguous generating means includes a phase meter.

3. An ambiguity resolver as claimed in claim 2 wherein the said ambiguous generating means includes a vector solver for determining the computation quantity $L_p$ in accordance with the formula $L_p = \sqrt{X_p^2 + Y_p^2}$ said vector solver being adapted to receive the quantities $X_p$ and $Y_p$ and said vector solver being connected to the said differential network, wherein $X_p$ and $Y_p$ are the rectangular coordinates of a flight position P, the origin of the coordinate system is at the said one of the three stations and $L_p$ is the polar distance from the coordinate origin to the flight position P.

4. An ambiguity resolver as claimed in claim 3 wherein the said detection means includes a bi-stable multivibrator driven by said differential network and controlling the said reversing relay, whereby a voltage output from the differential network in excess of a predetermined tolerance will actuate the relay.

5. An ambiguity resolver is claimed in claim 4 wherein said detecting means includes a rectifier connected to the said differential network, a D. C. reference voltage and a second differential network having connected to its input said rectifier and said D. C. reference voltage, the said second differential network having its output connected in controlling relationship to said bi-stable multivibrator.

References Cited in the file of this patent
UNITED STATES PATENTS 2,472,129   Streeter _____ June 7, 1949